INVENTOR.
Henry W. Stier
BY John D. Mesaros
HIS ATTORNEY

United States Patent Office 3,613,197
Patented Oct. 19, 1971

3,613,197
THREADING INSERT
Henry W. Stier, Dearborn Heights, Mich., assignor to Carmet Company, Pittsburgh, Pa.
Continuation of application Ser. No. 648,677, June 26, 1967. This application Mar. 9, 1970, Ser. No. 17,026
Int. Cl. B26d 1/00; B23g 1/00
U.S. Cl. 29—95
4 Claims

ABSTRACT OF THE DISCLOSURE

An indexable and reversible threading or grooving insert having a hub portion and a plurality of radially extending projections therefrom, each of said projections being substantially identical in size and shape, each of said projections having a pair of cutting edges on either side of the projection. Insert support means are also provided to support the operative cutting edge on the underside of its projection.

BACKGROUND OF THE INVENTION

This application is a continuation of Ser. No. 648,677, filed June 26, 1967, now abandoned.

Several mechanically held threading inserts would provide from one to four cutting edges, depending on the design available. However, one of the factors to be considered insofar as economy is concerned is the gram or unit weight per cutting edge. In current designs having from one to four cutting edges, the unit weight per cutting edge would be relatively high. Additionally, the retention of the insert has been by mechanical means frictionally engaging the side surfaces of the insert which has prevented direct support of the operative cutting edge. The insert according to my invention provides for a lower unit weight per cutting edge, and this insert can be used for V-thread, acme thread, or shallow grooving. This insert also permits support of the operative cutting edge directly beneath it.

It is accordingly an object of this invention to provide a new and improved insert having six or eight cutting edges.

It is another object of this invention to provide a new and improved insert having a relatively low gram or unit weight per cutting edge.

It is a further object of this invention to provide a new and improved mechanically held insert which is indexable and reversible to provide six or eight cutting edges.

It is still another object of this invention to provide a new and improved insert capable of being directly supported underneath the cutting edge.

SUMMARY OF THE INVENTION

The foregoing and other objects are accomplished by providing an insert shaped like a regular polygonal even number sided configuration having alternate sides thereof removed, permitting the remaining sides to form radially extending projections, each such projection being symmetrical with respect to a radius bisecting the remaining side to provide a pair of cutting edges on each of said projections. The polygonal configuration according to my invention is either a hexagon or an octagon to thereby provide six or eight cutting edges respectively.

BRIEF DESCRIPTION OF THE DRAWINGS

Other objects, features and advantages of the invention will become obvious when taken in conjunction with the accompanying drawings in which.

DESCRIPTION OF THE PREFERRED EMBODIMENTS

Figure 2:
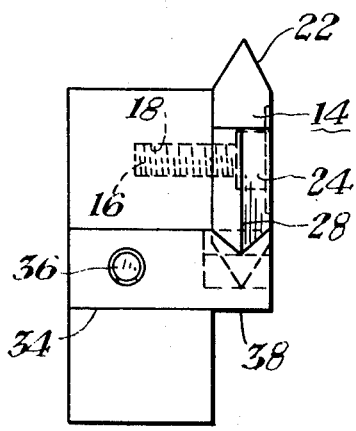
FIG. 2 is a front view of the tool holder and insert of FIG. 1.
Figure 1:
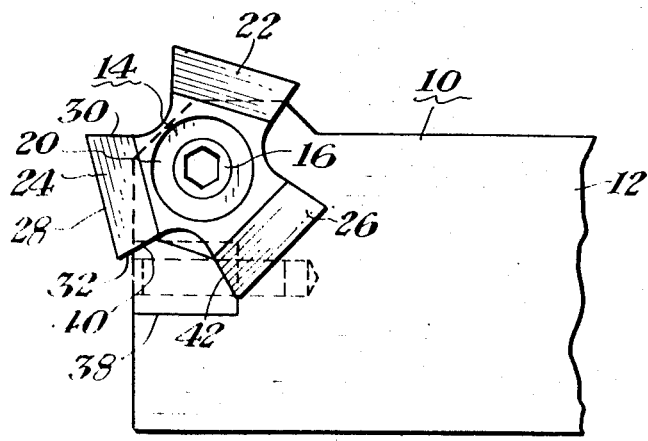
FIG. 1 is a side elevational view of a tool holder retaining the insert according to my invention.

Referring now to the drawings, and particularly to FIGS. 1 and 2, there is shown a tool holder assembly generally designated 10 including a tool body 12 having an insert 14 secured to the side surface thereof by screw means 16 extending through the insert and engaging a threaded aperture 18 in said tool body 12. The insert 14 has a central hub portion 20 and three radially extending projections 22, 24 and 26. Each of said projections is identical in configuration, and as shown in the particular embodiment, each projection is symmetrical with respect to a radius bisecting the peripheral edge of the projection. For example, projection 24 has a peripheral edge 28, a first upper cutting edge 30 formed by a transversely extending plane intersecting the peripheral edge 28, and a lower cutting edge 32 formed by a second plane intersecting the peripheral edge 28, the cutting edges 30 and 32 being symmetrical with respect to a radial line bisecting the peripheral edge 28. Each of the other projections 22 and 26 is similarly provided with a pair of cutting edges with each projection 22 and 26 being substantially identical to the aforementioned projection 24. As shown in FIG. 2, the cross sectional configuration of projections 22 and 24 is V-shaped, the configuration corresponding to the thread desired to be cut, or alternatively the projections may be configured for shallow grooving.

The insert 14 is secured to the tool body 12 by screw means 16 extending through the hub portion 20 of the insert 14. An insert support 34 is secured to the front of tool body 12 by screw means 36, the insert support 34 having an extension 38 for engaging the insert 14. As shown in FIG. 1, the extension 38 is provided with two bearing surfaces 40 and 42, the bearing surface 40 engaging the projection 24 at the lower cutting edge 32 thereof and the bearing surface 42 engaging the adjacent cutting edge on projection 26. Thus it can be seen that the operative cutting edge 30 is directly supported, and the insert support 34 along with screw means 16 provides three point support for the insert 14.

Figure 3:
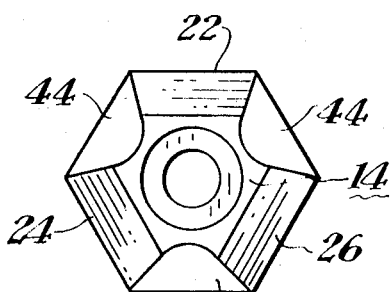
FIG. 3 shows a side elevational view of the insert utilized in FIG. 1 with the shaded portions indicating the portions removed from a hexagonal configuration to form the insert.

The particular configuration of the insert 14 can be viewed as a regular hexagon with alternate peripheral edges removed as shown in FIG. 3 with the shaded portions 44 indicating the removed portions. This then leaves the three radial projections 22, 24 and 26 with the two cutting edges per projection. Thus it can be seen that there is provided an indexable and reversible insert 14 having six cutting edges compactly arranged to provide economy. The size of the insert need be no larger than an insert having three or four cutting edges, but the unit weight per cutting edge, and hence, the economy of the insert is improved.

Figure 4:
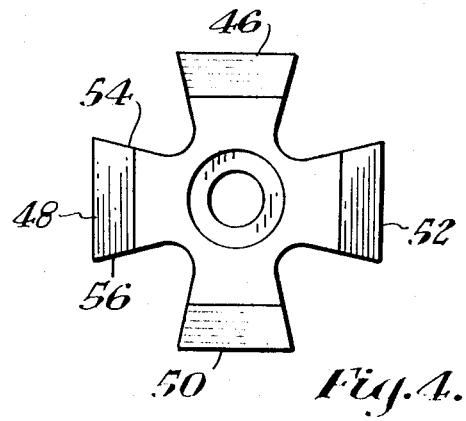
FIG. 4 shows a side elevational view of a modified insert having eight cutting edges.
Figure 5:
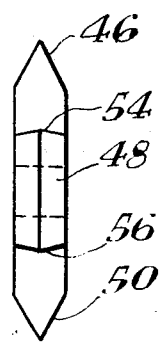
FIG. 5 shows a front view of the insert of FIG. 4.

An alternative embodiment is shown in FIGS. 4 and 5 wherein four radial projections 46, 48, 50 and 52 are provided. This particular configuration can be derived from an octagon with alternate peripheral edges removed and cut back to provide eight cutting edges, such as cutting edges 54 and 56 on projection 48.

While there have been shown and described preferred embodiments, it is to be understood that various adaptations and modifications can be made without departing from the spirit and scope of the invention.

I claim:

1. An indexable and reversible cutting insert comprising a hub portion having a bore extending therethrough, and a plurality of substantially identical radially extending projections secured to said hub substantially perpendicular to the axis of said hub, each of said projections reducing in cross-section to an outer peripheral edge substantially perpendicular to the direction of projection, said projections having sides forming cutting edges on two sides of said projection intersecting said peripheral edge and extending generally toward said hub portion, said cutting edges lying in planes substantially parallel to said hub axis, said projections having a cross-section symmetrical about a line extending from the center of said hub to said peripheral edge such that said cutting edges are also symmetrical about said line, the facing sides of adjacent projections joined in the vicinity of said hub being adapted to engage a support over the area of the jointure.

2. The cutting insert of claim 1 wherein said cutting edges of said projection lie in a plane disposed at an acute angle with the periphery thereof.

3. The cutting insert of claim 2 wherein said cutting edges are V-shaped.

4. The cutting insert of claim 3 wherein said facing sides of adjacent sections join in an arcuate section in the vicinity of said hub and are adapted to engage a comparably shaped support over said arcuate section.

References Cited

UNITED STATES PATENTS

| | | | |
|---|---|---|---|
| 632,678 | 9/1899 | Dock | 29—102 |
| 863,515 | 8/1907 | Dixon | 29—102 X |
| 969,983 | 9/1910 | Rosenbeck | 29—102 |
| 1,415,339 | 5/1922 | Hall | 29—105 X |
| 1,740,604 | 12/1929 | Kienzl | 10—101 |

FOREIGN PATENTS

| | | | |
|---|---|---|---|
| 335,489 | 9/1930 | Great Britain | 29—102 |
| 575,212 | 2/1946 | Great Britain | 29—102 |
| 836,880 | 10/1938 | France | 29—102 |
| 499,697 | 6/1930 | Germany | 29—96 |

HARRISON L. HINSON, Primary Examiner

U.S. Cl. X.R.

29—102; 10—101